(12) United States Patent
Eck et al.

(10) Patent No.: US 8,497,444 B2
(45) Date of Patent: Jul. 30, 2013

(54) PROTECTION DEVICE FOR ELECTRONIC SYSTEM

(75) Inventors: Alain Eck, Montmeyran (FR); Eric Bonnet, Malissard (FR); Eric Dubois, Malissard (FR)

(73) Assignee: Ingenico France, Neuilly sur Seine (FR)

( * ) Notice: Subject to any disclaimer, the term of this patent is extended or adjusted under 35 U.S.C. 154(b) by 154 days.

(21) Appl. No.: 12/933,456

(22) PCT Filed: Mar. 16, 2009

(86) PCT No.: PCT/FR2009/050427
§ 371 (c)(1),
(2), (4) Date: Dec. 21, 2010

(87) PCT Pub. No.: WO2009/122077
PCT Pub. Date: Oct. 8, 2009

(65) Prior Publication Data
US 2011/0100788 A1    May 5, 2011

(30) Foreign Application Priority Data
Mar. 21, 2008  (FR) ...................... 08 51843

(51) Int. Cl.
*H01H 1/10* (2006.01)
(52) U.S. Cl.
USPC ........................................ 200/517
(58) Field of Classification Search
USPC ............. 200/517, 512, 341, 345, 310, 314, 200/317
See application file for complete search history.

(56) References Cited

U.S. PATENT DOCUMENTS

| 4,500,756 | A  | * | 2/1985 | Feagans et al. | 200/5 A |
| 4,527,030 | A  | * | 7/1985 | Oelsch | 200/515 |
| 7,893,374 | B2 | * | 2/2011 | Aihara et al. | 200/314 |
| 2006/0042924 | A1 | * | 3/2006 | Ito | 200/512 |
| 2007/0152042 | A1 |   | 7/2007 | Mittler | |

FOREIGN PATENT DOCUMENTS

| DE | 43 12 905 | 10/1994 |
| FR | 2 815 733 | 4/2002 |
| FR | 2 901 896 | 12/2007 |
| WO | WO 2008/056085 | 5/2008 |

OTHER PUBLICATIONS

PCT International Search Report received in PCT/FR2009/050427 dated Nov. 27, 2009.
Written Opinion from the International Searching Authority received in PCT/FR2009/050427.

* cited by examiner

*Primary Examiner* — Felix O Figueroa
(74) *Attorney, Agent, or Firm* — Vedder Price PC

(57) ABSTRACT

An electronic system including an electronic circuit, an actuation device, a spacer and a protection device. The electronic circuit has a surface on which at least two first conductive tracks are arranged. The actuation device includes at least one first bearing element. The spacer is interposed between the electronic circuit and the actuation device and includes at least one opening at least partially receiving the bearing element. The protection device is interposed between the electronic circuit and the spacer and includes at least one second conductive track having ends respectively connected to first conductive portions of first deformable regions of the protection device. Each first portion is capable of contacting one of the first conductive tracks of the electronic circuit to electrically supply the second track under the effect of a deformation of first regions.

10 Claims, 7 Drawing Sheets

PROTECTION DEVICE FOR ELECTRONIC SYSTEM

FIELD OF THE INVENTION

The present invention relates to a device for protecting an electronic system, for example, a banking card reader, especially a chip card reader, against intrusions.

DISCUSSION OF PRIOR ART

A banking card reader generally comprises a package containing a printed circuit on which electronic components are connected. The reader comprises a keyboard corresponding to a flexible membrane partially covering the printed circuit and at the level of which the keys of a keyboard are formed. Each key generally comprises, on the printed circuit side, a conductive land. The separate ends of two conductive tracks are arranged on the printed circuit under each key. These ends for example correspond to interdigitated combs.

In the absence of an external action on the keyboard, each key is in an idle position where it is distant from the printed circuit. When a user presses a key, said key moves until the associated conductive land creates an electric contact between the ends of the two underlying metal tracks. The key and the underlying printed circuit tracks thus behave as a generally off switch which is turned on when a user presses the key.

The card reader generally comprises a device of protection against intrusions formed of one or several dummy keys provided at the level of the keyboard membrane and which are not visible from the outside of the package. Each dummy key is maintained in permanent contact with the printed circuit by the reader package so that it creates a permanent electric connection between two tracks of the printed circuit.

When someone tries to open the package, the dummy key is no longer actuated by the package and moves away from the printed circuit. The dummy key and the underlying tracks of the printed circuit thus behave as a switch which is on when the reader package is properly closed and which is off when the package is open. The turning-off of this switch is detected by a specific electronic circuit provided at the printed circuit level.

The use of dummy keys may not provide a sufficient protection, especially in the case where a spacer is interposed between the keyboard membrane and the underlying printed circuit, for example, to behave as a light diffuser to light the keyboard membrane from the inside of the package (backlighting of the keys). The spacer comprises openings enabling the passing of the normal and dummy keys of the keyboard membrane. A disadvantage of such a reader structure is that it may be relatively easy to fill the spacer openings associated with the dummy keys with glue so that the dummy keys remain permanently glued to the printed circuit. The reader package can then be opened without interrupting the contact between the dummy keys and the printed circuit.

Document US-A-2007/152042 describes a keyboard for a chip card reader equipped with a light guide and with a membrane of protection against the introduction of the needle of a hypodermic syringe enabling to short-circuit safety keys (dummy keys).

Document DE-A-4312905 describes a device for protecting the keyboard of a chip card reader comprising a conductive track supplied by a peripheral connector. The device is intended to be folded up around the electronic circuit of the keyboard. The use of a conductive track protects the electronic circuit against possible intrusions. However, the presence of a peripheral connector to power the conductive track creates a weak point in the system security.

FIELD OF THE INVENTION

The present invention aims at a device for protecting an electronic system comprising a package containing a keyboard membrane separated from a printed circuit by a spacer against intrusion attempts.

Thus, an embodiment of the present invention provides an electronic system, comprising:

an electronic circuit having a surface on which at least two first conductive tracks are arranged;

an actuation device comprising at least one first bearing element;

a spacer interposed between the electronic circuit and the actuation device and comprising at least one opening at least partially receiving the bearing element; and a protection device interposed between the electronic circuit and the spacer and comprising at least one second conductive track having ends respectively connected to first conductive portions of first deformable regions of the protection device, each first portion being capable of contacting one of the first conductive tracks of the electronic circuit to electrically supply the second track under the effect of a deformation of said first regions.

According to an embodiment of the present invention, said first deformable regions are arranged outside of the periphery of the protection device.

According to an embodiment of the present invention, said first conductive portions are distant from the first conductive tracks in the absence of an external action exerted on the first deformable region, the first bearing elements being capable of deforming the first deformable regions to put the first conductive portions in contact with the first conductive tracks, whereby the respective ends of the second track are connected to the first conductive tracks.

According to an embodiment of the present invention, the protection device comprises a deformed area, the electronic circuit comprising electronic components covered by said area, the second conductive track extending at the level of said area.

According to an embodiment of the present invention, the protection device further comprises at least one second conductive portion supported by a second deformable region and separated from the second conductive track by an insulating region, the second conductive portion being, in the absence of an external action exerted on the second deformable region, distant from the third and fourth conductive tracks supported by the electronic circuit, at least one second bearing element being capable of deforming the second deformable region to put the second conductive portion in contact with the third and fourth conductive tracks, whereby the third and fourth conductive tracks are electrically connected.

According to an embodiment of the present invention, the protection device comprises a stack of first, second, and third insulating films, the second conductive track being arranged between the first and second insulating films, the third film being in contact with the electronic circuit and comprising openings at least in front of the first conductive tracks, exposing the conductive portions.

According to an embodiment of the present invention the spacer is formed of a material capable of diffusing light and comprises a first surface on the side of the actuation device and a second surface on the side of the electronic circuit, the electronic circuit comprising at least one light source, and the spacer comprising a non-through recess on the side of the second surface, containing said light source.

According to an embodiment of the present invention, the spacer comprises a first planar surface on the side of the actuation device and a second planar surface on the side of the electronic circuit, the first surface being tilted with respect to the second surface by an angle ranging between 1° and 20°.

According to an embodiment of the present invention, the actuation device comprises a membrane covering the spacer, the membrane comprising at least one key which is mobile with respect to the electronic circuit, capable of being displaced by a user and extending in one of the second bearing elements.

According to an embodiment of the present invention, the actuation device comprises a package containing the electronic circuit, the spacer, and the protection device, the package comprising an internal surface and a portion projecting from the internal surface and being capable of holding the first bearing elements against the first deformable regions of the protection device when the package is closed.

BRIEF DESCRIPTION OF THE DRAWINGS

The foregoing and other objects, features, and advantages of the present invention will be discussed in detail in the following non-limiting description of specific embodiments in connection with the accompanying drawings.

DETAILED DESCRIPTION

Figure 1:
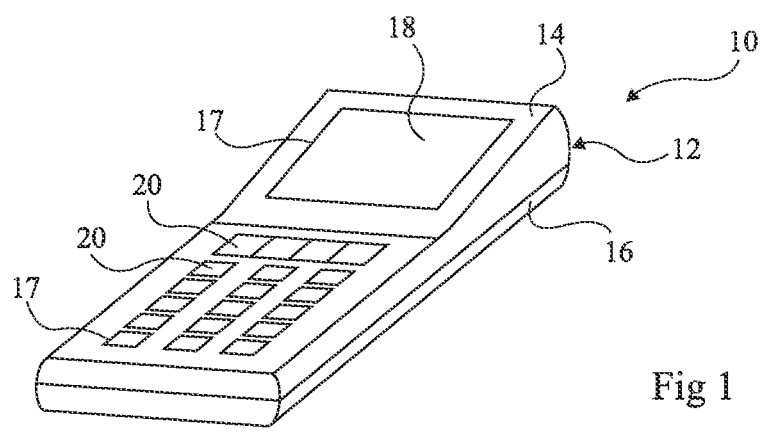
FIG. 1 is a simplified perspective view of an example of a card reader.

For clarity, the same elements have been designated with the same reference numerals in the different drawings. Further, only those elements which are necessary to the understanding of the present invention will be described.

The present invention provides, in an electronic circuit comprising a package containing a printed circuit separated from a keyboard membrane by a spacer, to interpose a protection device between the spacer and the printed circuit. The protection device corresponds to a flex circuit formed of a layer stack. The flex circuit comprises conductive elements on the printed circuit side, which form switches with conductive tracks of the printed circuit. Further, one or several conductive tracks are arranged in a lattice in the layer stack and are connected to an electronic safety circuit provided at the printed circuit level. The safety circuit is capable of detecting a modification of the electric voltage of the conductive tracks of the protection device.

FIG. 1 schematically shows an embodiment of an electronic circuit 10, for example, a banking card reader. Reader 10 comprises a package 12 formed of an upper package portion 14 connected to a lower package portion 16. Openings 17 are provided at the level of upper package portion 14 for a display 18 and keys 20 belonging, for example, to a keyboard. Further, an opening, not shown, is provided in package 12 to enable to introduce cards.

Figure 2:
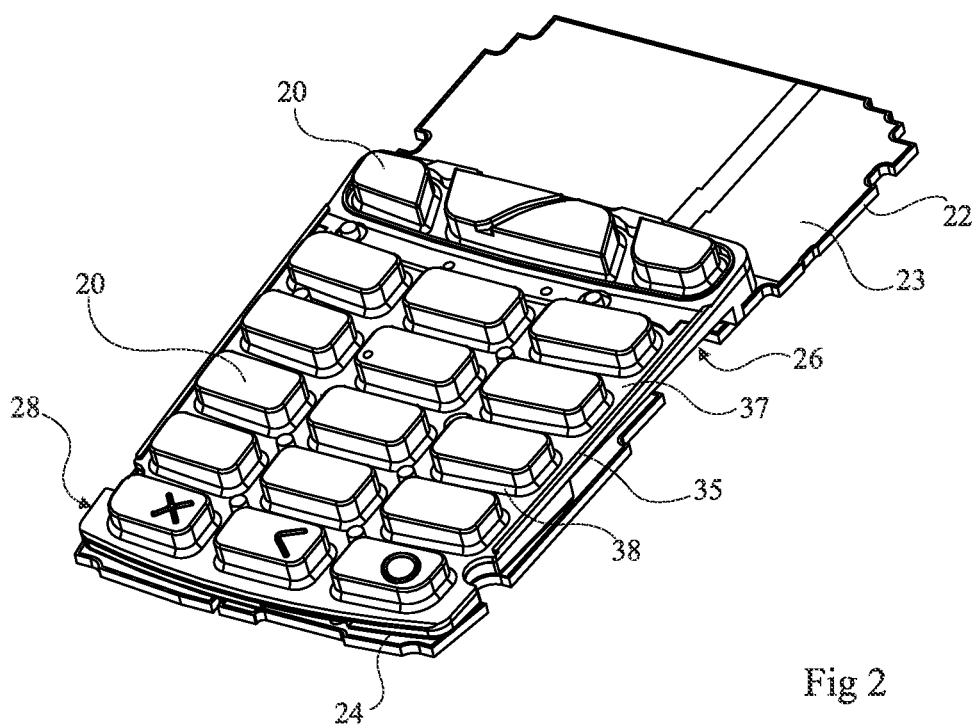
FIG. 2 is a perspective view of an embodiment of some internal elements of the reader of FIG. 1.
Figure 3:
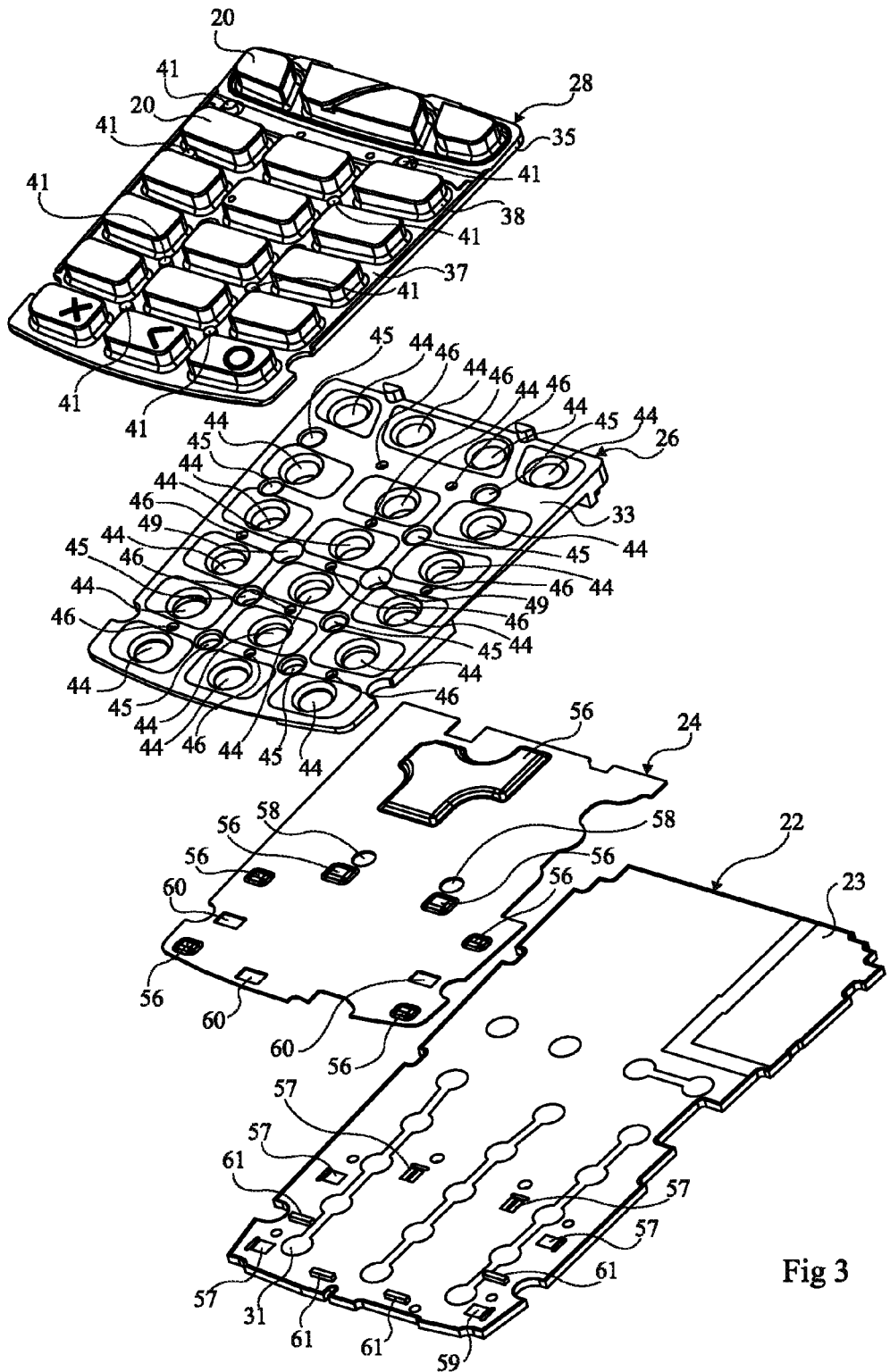
FIGS. 3 and 4 are respective exploded perspective three-quarter top and bottom views of the elements of FIG. 2.
Figure 4:
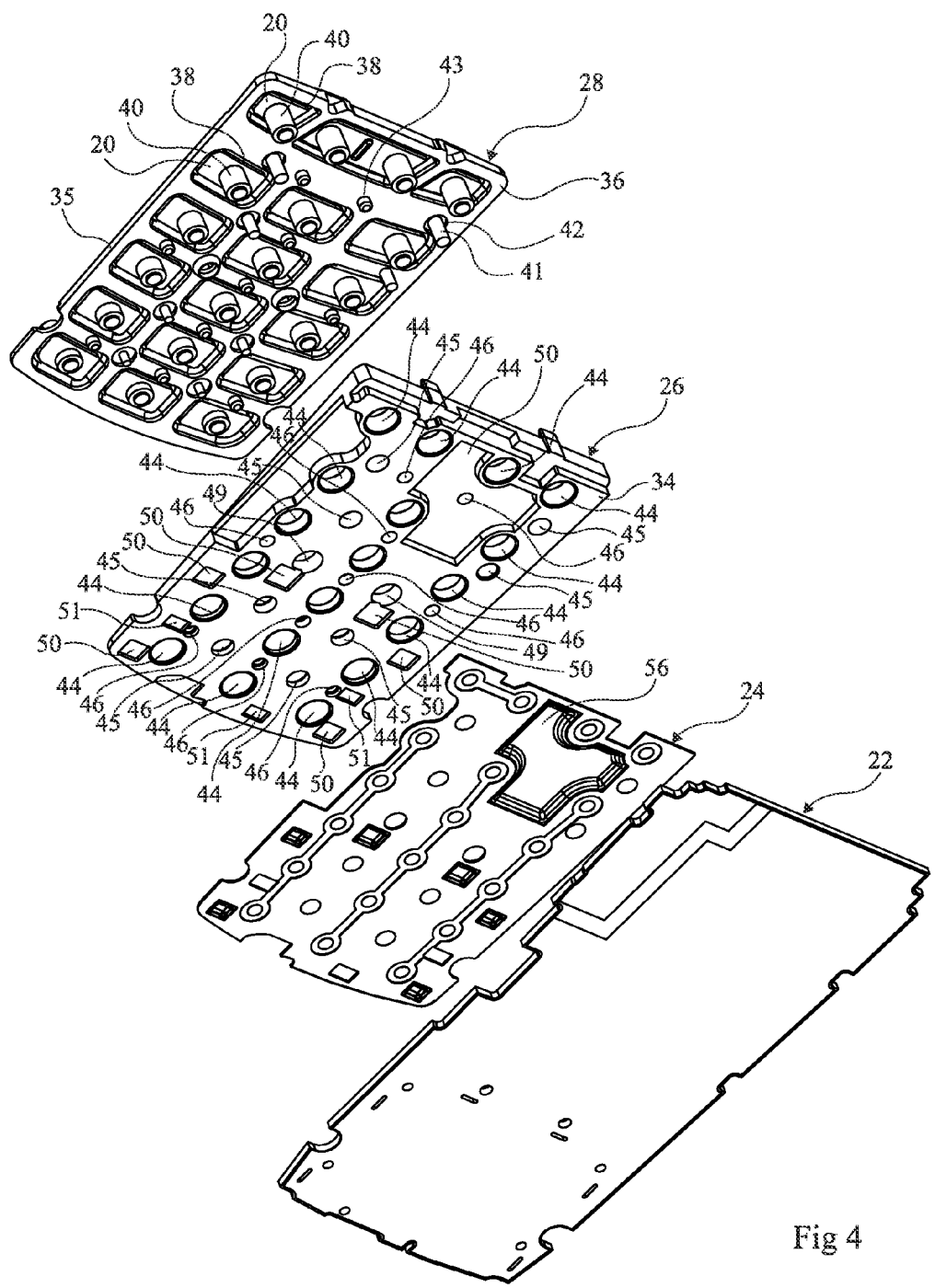

FIGS. 2, 3, and 4 respectively are a general perspective view, an exploded three-quarter top view and an exploded three quarter bottom view of an embodiment of some internal elements of reader 10 of FIG. 1. Reader 10 contains a printed circuit 22 on which electronic components are connected, only a few electronic components being shown in FIG. 3. Printed circuit 22 comprises a surface 23 partially covered with a protection device 24 which will be described in further detail hereafter. In the present embodiment, protection device 24 is covered with a spacer 26 behaving as a light diffuser. Spacer 26 is covered with a flexible membrane 28 forming a keyboard, at the level of which keys 20 are formed. Keyboard membrane 28 comprises nineteen keys 20.

Printed circuit 22 comprises conductive tracks, not shown, for example, made of copper, on the side of surface 23. Only some locations of conductive tracks of printed circuit 22 forming switches of power supply contact areas have been shown in the form of ellipses 31. A switch corresponds, for example, to the different ends of two conductive tracks which correspond, for example, to interdigitated combs. A power supply contact area corresponds, for example, to a comb.

Spacer 26 comprises an upper surface 33 covered with keyboard membrane 28 and a lower surface 34 resting on protection device 24. According to the present embodiment, surfaces 33 and 34 are not parallel and form an angle of a few degrees, for example ranging between 1° and 20°, preferably between 2° and 6°.

Keyboard membrane 28, for example made of silicone or polyurethane, comprises a base 35 having a surface 36 resting on spacer 26 and a surface 37 oriented towards upper package portion 14. Each key 20 has a substantially parallelepipedal shape and is connected to base 35 by a thinned-down upper lip 38. Further, each key 20 in continued on the side of surface 36 by a pin 40 which projects substantially perpendicularly to the plane of base 35. Keyboard membrane 28 further comprises pins 41 which project from surface 36 substantially perpendicularly thereto and which are connected to base 35 by a thinned-down peripheral lip 42. Keyboard membrane 28 also comprises lugs 43 distributed on surface 36 of base 35. The length of pins 40, 41 is not uniform. More specifically, the length of pins 40, 41 increases along with the thickness of the portion of spacer 26 located close to the considered pins. In the present embodiment, keyboard membrane 28 comprises nineteen pins 40, eight pins 41, and ten lugs 43.

Spacer 26 is crossed by nineteen cylindrical openings 44 intended to receive pins 40 of keyboard membrane 28 and eight cylindrical openings 45, of same diameter or of smaller diameter than openings 44 and intended to receive pins 41. Further, spacer 26 is crossed by ten cylindrical openings 46 of smaller diameter intended to receive lugs 43. In the present embodiment, openings 44, 45, 46 have axes perpendicular to surface 33 of spacer 26. Spacer 26 comprises through openings 49 intended for the passing of elements of reader 10, for example, means for fastening package 12. Spacer 26 comprises non-through recesses 50, 51 on the side of surface 34.

Figure 5:
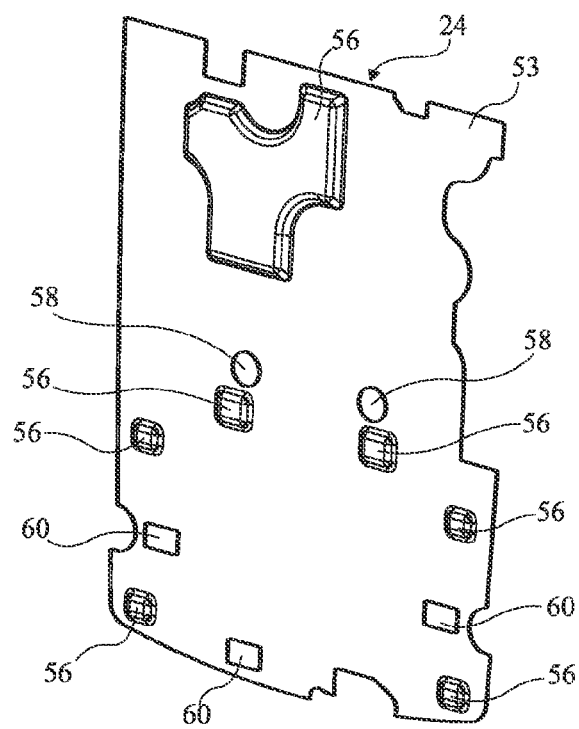
FIGS. 5 and 6 are perspective views of the two surfaces of the protection device shown in FIG. 2.
Figure 6:
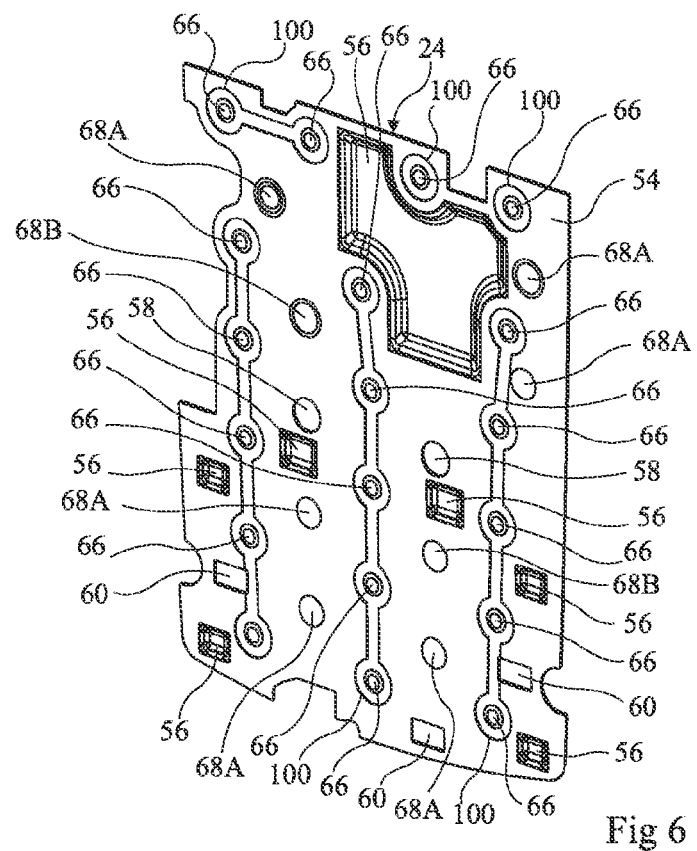

FIGS. 5 and 6 show more detailed perspective views of protection device 24. Reference numeral 53 is used to designate the surface of protection device 24 in contact with spacer 26 and reference numeral 54 is used to designate the surface of protection device 24 covering printed circuit 22. Surface 53 cannot extend under the entire surface 33 of spacer 26. In particular, the peripheral shape of protection device 24 may enable the passing of electronic components connected to surface 23 of printed circuit 22.

Protection device 24 has a resilient structure. It is capable of being locally deformed and takes, in the absence of external action, a generally planar shape except for indentations 56 which project on the side of surface 53. Each indentation 56 is arranged at the level of one of recesses 50 of spacer 26 and may have a shape substantially complementary to the associated recess 50. Each indentation 56 may be obtained by plastic deformation of protection device 24. Electronic components 57 may be provided on printed circuit 22 at the level of at least some of indentations 56 of protection device 24.

Through openings 58, 60 may be provided in protection device 24. More specifically, each opening 58 is provided substantially as an extension of one of openings 49 of spacer 26 and is intended to enable the passing of elements of the reader, for example means for fastening upper and lower package portions 14, 16. Openings 60 are provided substantially as an extension of recesses 51 of spacer 26 and are intended to enable the passing of light-emitting diodes 61 connected to surface 23 of printed circuit 22.

Protection device 24 comprises, on the side of surface 54, planar conductive lands 66, for example, made of carbon, for each of keys 20. Protection device 24 further comprises, on the side of surface 54, domed conductive elements 68A and 68B, called domes. Each dome 68A, 68B is associated with a pin 41. Domes 68A and 68B have slightly different structures, as will be described in further detail hereafter.

FIGS. 7 to 12 show partial simplified cross-section views of the stack formed by printed circuit 22, protection device 24, spacer 26, and keyboard membrane 28 at the level of a carbon land 66, of a dome 68A, and of a dome 68B. In the drawings, the ratios between dimensions are not kept with respect to the preceding drawings. According to the present embodiment, protection device 24 is a flex circuit formed of a substrate 78 made of a resilient material, for example, a thermoplastic resin such as polyethylene therephtalate (PET) having a thickness, for example, on the order of 0.1 mm. One or several conductive tracks 80 are formed on substrate 78 on the side of printed circuit 22. Tracks 80 are, for example, made of silver ink and are obtained by serigraphy. Tracks 80 and substrate 78 are covered with a varnish layer 92, for example, formed of a dielectric material. A stack 93 of three layers 94, 96, and 98, forming a separator, covers varnish layer 92. Separator 93 has, for example, a thickness on the order of 0.2 mm. It is possible for separator 93 not to be present at the level of each indentation 56. Spacer 26 may be held on protection device 24 via a gluing material 99. Separator 93 comprises an opening 100 at the level of each switch or power supply contact area 31. For FIGS. 7 to 10, a switch 31 has been shown in the form of two separate conductive tracks 101, 102 formed on printed circuit 22 substantially at the level of opening 100 of separator 93 and, for FIGS. 11 and 12, a power supply contact area 31 has been shown in the form of a conductive track 103.

Figure 7:
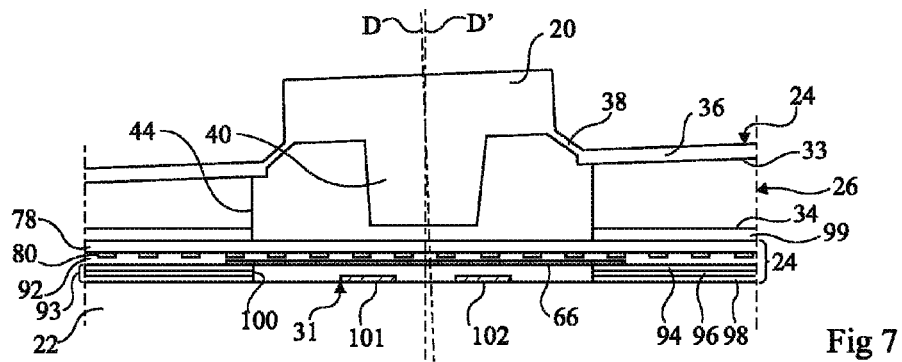
FIGS. 7 and 8 are simplified cross-section views of the reader of FIG. 1 at the level of a keyboard key at two stages of the reader operation.
Figure 8:
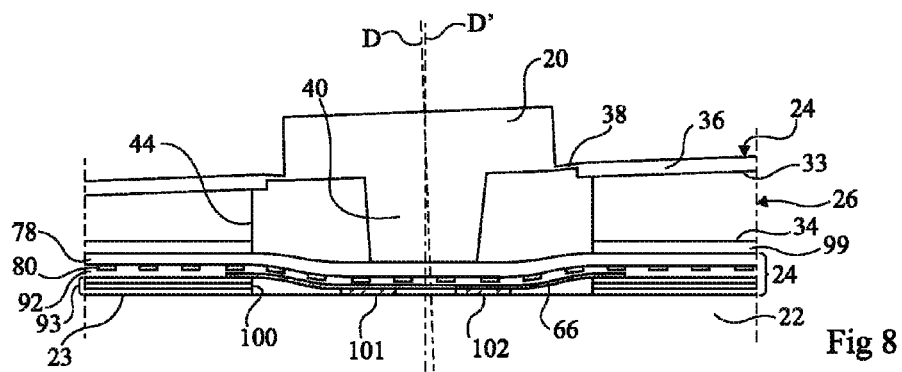

FIGS. 7 and 8 are cross-section views at the level of a conductive land 66 respectively in the absence of any action on key 20 and when key 20 is pressed. Carbon land 66 covers varnish layer 92 and opening 100 of separator 93 at least partially exposes carbon land 66. As appears in FIG. 8, when key 20 is pressed, lip 38 deforms to enable the key to move down along an axis D substantially perpendicular to surface 33. Pin 40 causes a local deformation of protection device 24 along axis D' perpendicularly to surface 34 at the level of opening 100 of separator 93 so that carbon land 66 comes into contact with tracks 101 and 102 and provides an electric connection between the tracks. When no further pressure is exerted on key 20, protection device 24 resiliently returns to its neutral position in which it takes a planar configuration at the level of pin 40, land 66 being then separated from conductive tracks 101, 102.

Figure 9:
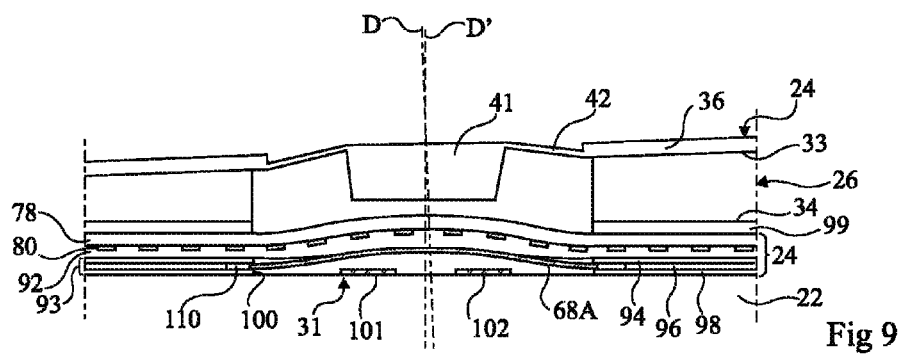
FIGS. 9 and 10 are simplified cross-section views of the reader of FIG. 1 at the level of a dummy key respectively when the reader package is open and closed.
Figure 10:
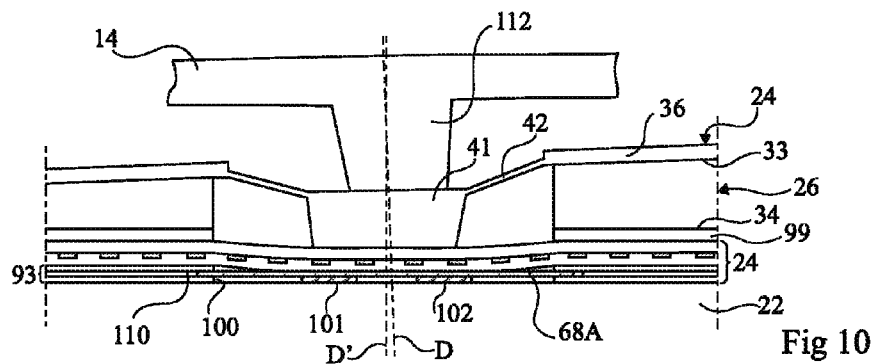

FIGS. 9 and 10 are cross-section views at the level of a conductive dome 68A respectively in the absence and in the presence of upper package portion 14. Dome 68A is a metal part having, for example, a 0.05-mm thickness corresponding, for example, to a portion of a sphere or of an ellipsoid. Dome 68A is formed, for example, by deformation of a spring steel plate. The peripheral edge of dome 68A may be located in a housing 110 provided in separator 93. When upper package portion 14 is arranged, a finger 112 provided at the level of the internal surface of upper package portion 14 bears against pin 41, which is displaced and bears against dome 68A. Dome 68A deforms to come into contact with conductive tracks 101, 102, creating an electric contact between them. The deformed state of dome 68A corresponds to an unstable position thereof so that, as soon as the action of finger 112 on pin 41 stops, dome 68A takes back its domed shape and breaks the electric contact with tracks 101, 102.

Figure 11:
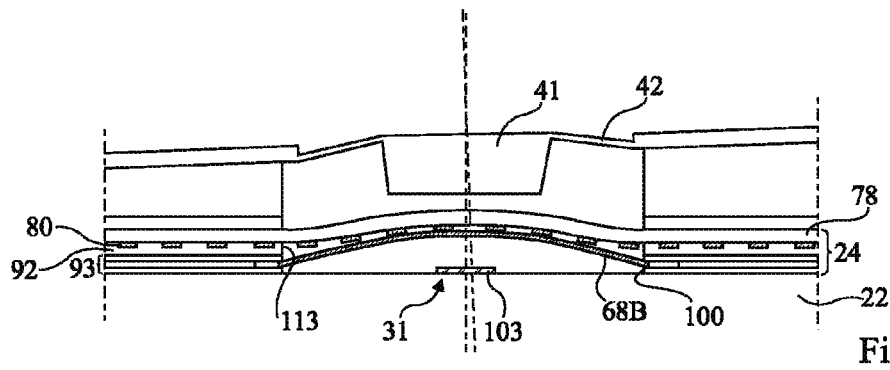
FIGS. 11 and 12 are cross-section views similar to FIGS. 9 and 10 at the level of a power supply contact area of the protection device.

FIG. 11 is a view similar to FIG. 9 at the level of a dome 68B. As compared with what has been previously described in relation with FIG. 9, varnish layer 92 comprises an opening 113 which exposes one or several sections of track 80 substantially at the level of dome 68B. Thereby, when flex circuit 24 and dome 68B are deformed under the action of pin 41, dome 68B comes into contact, on the one hand, with track 80 and, on the other hand, with track 103 of printed circuit 22. Such a contact is used to supply track 80. The deformed state of dome 68B corresponds to an unstable position thereof so that, as soon as the action of finger 112 on pin 41 stops, dome 68B takes back its domed shape and breaks the electric contact between track 103 and track 80.

Figure 13:
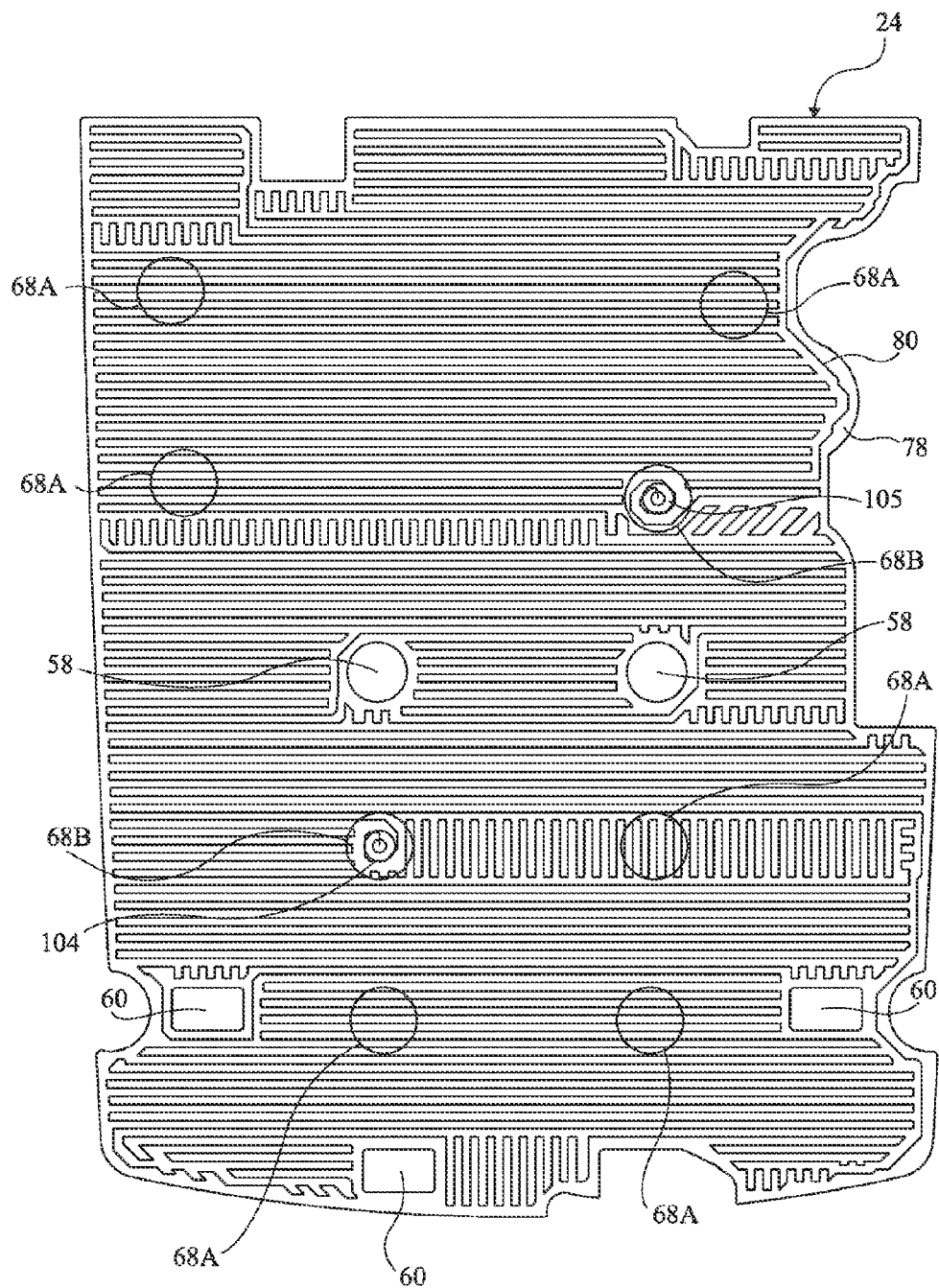
FIG. 13 is a bottom view of an example of distribution of internal conductive tracks of a variation of the protection device shown in FIG. 6.

FIG. 13 is a bottom view of protection device 24 showing an example of distribution of conductive tracks 80 on substrate 78. Domes 68A and 68B have been shown in the form of circles. In the present example, a single track 80 extends on substrate 78. Track 80 comprises a first end pad 104 at the level of one of domes 68B and a second end pad 105 at the level of the other dome 68B. Track 80 substantially zigzags across the entire surface of protection device 24. In particular, track 80 extends at the level of domes 68A and of conductive lands 66, not shown. Conductive track 80 also extends at the level of indentations 56.

Preferably, the section of track 80 brought by deformable dome 68B into contact with a conductive track 103 of circuit 22 corresponds to an end of track 80. Thus, both ends of track 80 are connected to conductive portions of deformable regions (domes 68B) of the protection device.

Figure 12:
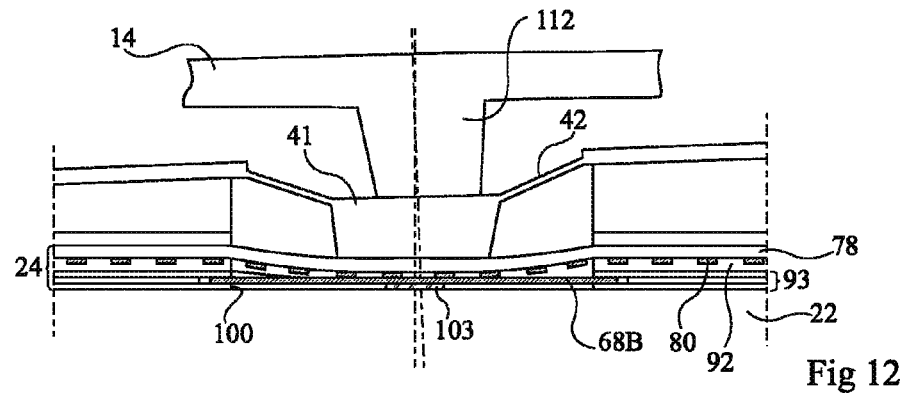

Although this is not clearly shown in FIGS. 11 and 12, deformable conductive region 68B is only in contact with the end point of track 80 by an opening through insulating layer 92. Indeed, it is not desirable for the contact to short-circuit several sections since this risks to "blind" some areas of the protection device and then to adversely affect the reliability of the detection.

To avoid a pirate supply of track 80, domes 68B for supplying track 80 (and thus end pads 104 and 105) are placed outside of the periphery of the protection device. Thus, conductive track 80 protects not only against an intrusion attempt by means of a probe or the like, but also against a displacement of the system. The corresponding detections are performed by one or several adapted electronic circuits, supported by the printed circuit.

The width of conductive track 80 may be variable but preferably remains much lower (preferably, by a factor greater than 5) than the diameter of a dome. The narrower track 80 and the lower the intervals between sections, the better the sensitivity of the detection device. Further, the pattern followed by track 80 may take different shapes (coils, combs, curved sections, etc.). In the case where several tracks 80 are provided, they may be supplied by same deformable regions of the protection device and corresponding tracks of the printed circuit, or be associated with different deformable regions.

Figure 14:
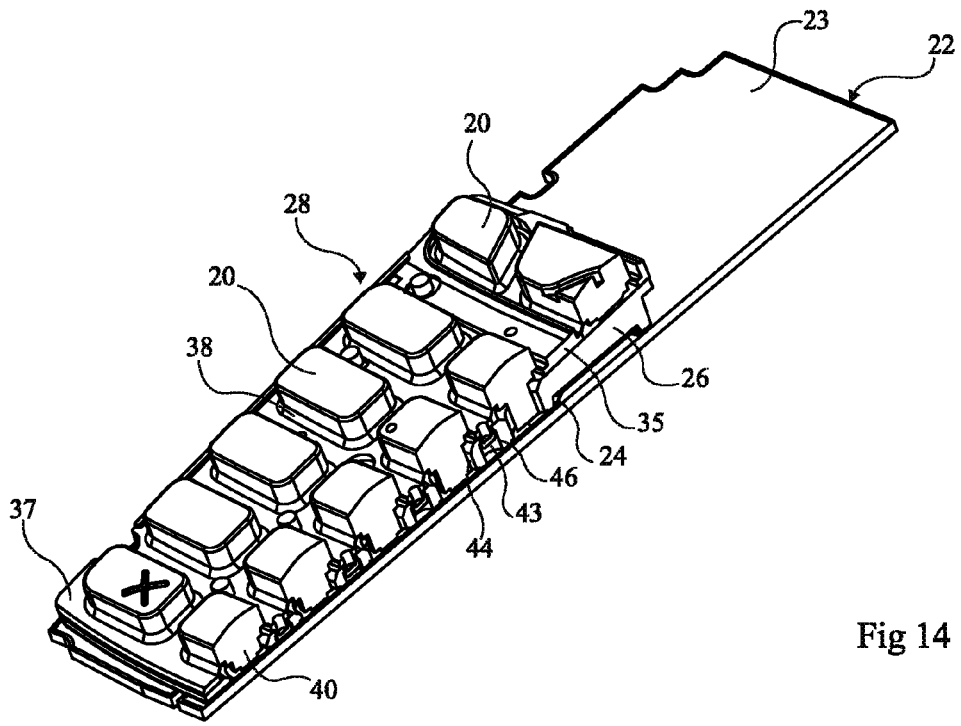
FIG. 14 is a perspective view showing a cross-section of the elements shown in FIG. 2.

FIG. 14 is a view similar to FIG. 2 in which a cross-section has been made. Lugs 43 of keyboard membrane 28 are held in the corresponding openings 46 of spacer 26 and hold keyboard membrane 28 in position with respect to spacer 26.

The present embodiment enables to prevent the access to metal tracks 101, 102 of printed circuit 22 while preserving the switch function of pins 40, 41.

The present embodiment enables to protect some electronic components 57 present on printed circuit 22 against an intrusion by encapsulating these components 57 with protection device 24.

In the present embodiment, the two surfaces 33, 34 of spacer 26 may be tilted with respect to each other and not parallel. Spacer 26 enables to tilt the displacement axes of keys 20 of the keyboard with respect to the displacement axes of the deformable portions of protection device 24. Keys 20 can thus be oriented to obtain the simplest and most natural possible motions for a user.

In the present embodiment, for each key 20, protection device 24 is planar in the absence of an external action and is deformed to provide the electric connection between conductive land 66 and conductive tracks 101, 102. The travel of protection device 24 is on the order of 1 mm. The switching speed is thus privileged. For pins 41, protection device 24 has, in the absence of an external action, a domed shape due to resilient conductive element 68A and is deformed to provide the electric connection between conductive element 68A and conductive tracks 101, 102.

Specific embodiments of the present invention have been described. Various alterations and modifications will occur to those skilled in the art. In particular, it may be provided to associate with keys 20 of keyboard membrane 28 the structure of protection device 24 shown in FIGS. 9 and 10 where protection device 24 comprise a resilient conductive element 68A having a domed shape in the absence of an external action. In this case, when key 20 is pressed, pin 40 continuing key 20 deforms conductive element 68A to provide the electric connection between conductive tracks 101, 102 of printed circuit 22. Further, a protection device in which membrane 28 would be used as a substrate for track 80 and where conductive lands 66 and domes 68A and 68B would be directly placed on membrane 28, may be envisaged. Further, the resilient function of domes 68A and 68B may be achieved by thermoforming of protection device 24 above areas 31.

The invention claimed is:
1. An electronic system comprising:
   an electronic circuit having a surface on which at least first and second conductive tracks are arranged;
   an actuation device comprising at least first and second bearing elements;
   a spacer interposed between the electronic circuit and the actuation device and comprising at least a first opening at least partially receiving the first bearing element and a second opening at least partially receiving the second bearing element; and
   a protection device interposed between the electronic circuit and the spacer and comprising at least one third conductive track zigzagging across a surface of the protection device and having first and second ends, the first end being electrically connected to a first conductive portion of a first deformable region of the protection device and the second end being electrically connected to a second conductive portion of a second deformable region of the protection device, the first and second conductive portions being distinct from the third conductive track, the first conductive portion being capable of contacting the first conductive track of the electronic circuit and the second conductive portion being capable of contacting the second conductive track of the electronic circuit to electrically supply the third conductive track under the effect of a deformation of said first and second deformable regions.

2. The system of claim 1, wherein said first and second deformable regions are arranged outside of the periphery of the protection device.

3. The system of claim 1, wherein said first and second conductive portions are distant from the first and second conductive tracks in the absence of an external action exerted on the first and second deformable regions, the first and second bearing elements being capable of deforming the first and second deformable regions to put the first and second conductive portions in contact with the first and second conductive tracks, whereby the first and second ends of the third conductive track are connected to the first and second conductive tracks.

4. The system of claim 1, wherein the protection device comprises a deformed area, the electronic circuit comprising electronic components covered by said area, the third conductive track extending at the level of said area.

5. The system of claim 1, wherein the protection device further comprises at least one third conductive portion supported by a third deformable region and separated from the third conductive track by an insulating region, the third conductive portion being, in the absence of an external action exerted on the third deformable region, distant from fourth and fifth conductive tracks supported by the electronic circuit, at least one third bearing element being capable of deforming the third deformable region to put the third conductive portion in contact with the fourth and fifth conductive tracks, whereby the fourth and fifth conductive tracks are electrically connected.

6. The system of claim 1, wherein the protection device comprises a stack of first, second, and third insulating films, the third conductive track being arranged between the first and second insulating films, the third film being in contact with the electronic circuit and comprising openings at least in front of the first and second conductive tracks, exposing the first and second conductive portions.

7. The system of claim 1, wherein the spacer is formed of a material capable of diffusing light, wherein the spacer comprises a first surface on the side of the actuation device and a second surface on the side of the electronic circuit, wherein the electronic circuit comprises at least one light source, and wherein the spacer comprises a non-through recess on the side of the second surface, containing said light source.

8. The system of claim 1, wherein the spacer comprises a first planar surface on the side of the actuation device and a second planar surface on the side of the electronic circuit, the first surface being tilted with respect to the second surface by an angle ranging between 1° and 20°.

9. The system of claim 5, wherein the actuation device comprises a membrane covering the spacer, the membrane comprising at least one key which is mobile with respect to the electronic circuit, capable of being displaced by a user and extending in the third bearing element.

10. The system of claim 1, wherein the actuation device comprises a package containing the electronic circuit, the spacer, and the protection device, the package comprising an internal surface and a portion projecting from the internal surface and being capable of holding the first and second bearing elements against the first and second deformable regions of the protection device when the package is closed.

* * * * *